(12) United States Patent
Tang et al.

(10) Patent No.: US 12,087,097 B2
(45) Date of Patent: Sep. 10, 2024

(54) IMAGE RECOGNITION METHOD AND APPARATUS, COMPUTER-READABLE STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Mengyun Tang, Shenzhen (CN); Ge Pei, Shenzhen (CN); Shuisheng Liu, Shenzhen (CN); Sijia Tu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 311 days.

(21) Appl. No.: 17/676,111

(22) Filed: Feb. 18, 2022

(65) Prior Publication Data

US 2022/0172518 A1  Jun. 2, 2022

Related U.S. Application Data

(63) Continuation of application No. PCT/CN2020/123903, filed on Oct. 27, 2020.

(30) Foreign Application Priority Data

Jan. 8, 2020  (CN) .......................... 202010017583.4

(51) Int. Cl.
*G06V 40/40*  (2022.01)
*G06V 10/22*  (2022.01)
(Continued)

(52) U.S. Cl.
CPC .............. *G06V 40/40* (2022.01); *G06V 10/22* (2022.01); *G06V 10/426* (2022.01);
(Continued)

(58) Field of Classification Search
CPC ...... G06V 40/40; G06V 10/443; G06V 10/75; G06V 40/161; G06V 10/426; G06V 10/22; G06V 10/764; G06V 10/766
See application file for complete search history.

(56) References Cited

U.S. PATENT DOCUMENTS 10,671,870 B2  6/2020  Ma
2016/0371820 A1*  12/2016  Hiasa ..................... G06T 7/207
(Continued)

FOREIGN PATENT DOCUMENTS

CN    103116763 A    5/2013
CN    103678984 A    3/2014
(Continued)

OTHER PUBLICATIONS

The World Intellectual Property Organization (WIPO) International Search Report for PCT/CN2020/123903 Jan. 29, 2021 7 Pages (including translation).
(Continued)

*Primary Examiner* — David Perlman
(74) *Attorney, Agent, or Firm* — ANOVA LAW GROUP, PLLC

(57) ABSTRACT

This application provides an image recognition method and apparatus, an electronic device, and a computer-readable storage medium, and relates to the field of artificial intelligence technologies. The method includes obtaining feature information corresponding to a target object in an image to be recognized, the feature information comprising blur degree information, local feature information, and global feature information; determining a category of the target object based on the feature information, and determining a confidence level corresponding to the target object; and
(Continued)

obtaining target information corresponding to the image to be recognized according to the category of the target object and the confidence level.

20 Claims, 7 Drawing Sheets

(51) Int. Cl.
| | |
|---|---|
| G06V 10/426 | (2022.01) |
| G06V 10/44 | (2022.01) |
| G06V 10/75 | (2022.01) |
| G06V 10/764 | (2022.01) |
| G06V 10/766 | (2022.01) |
| G06V 40/16 | (2022.01) |

(52) U.S. Cl.
CPC ............ *G06V 10/443* (2022.01); *G06V 10/75* (2022.01); *G06V 10/764* (2022.01); *G06V 10/766* (2022.01); *G06V 40/161* (2022.01); *G06V 2201/07* (2022.01)

(56) References Cited

U.S. PATENT DOCUMENTS

| | | | | |
|---|---|---|---|---|
| 2018/0357501 | A1* | 12/2018 | Ma | G06V 40/164 |
| 2019/0279115 | A1* | 9/2019 | Park | G06V 10/94 |
| 2020/0074148 | A1* | 3/2020 | Xu | G06F 18/214 |

FOREIGN PATENT DOCUMENTS

| | | |
|---|---|---|
| CN | 101739555 B | 11/2014 |
| CN | 106548145 A | 3/2017 |
| CN | 106557726 A | 4/2017 |
| CN | 106650669 A | 5/2017 |
| CN | 107133948 A | 9/2017 |
| CN | 107358157 A | 11/2017 |
| CN | 107886070 A | 4/2018 |
| CN | 107992845 A | 5/2018 |
| CN | 108446690 A | 8/2018 |
| CN | 108664843 A | 10/2018 |
| CN | 109086675 A | 12/2018 |
| CN | 109711254 A | 5/2019 |
| CN | 109948439 A | 6/2019 |
| CN | 111241989 A | 6/2020 |

OTHER PUBLICATIONS

J. Thies et al., "Face2Face: Real-time face capture and reenactment of RGB videos," In Proceedings of the IEEE Conference on Computer Vision and Pattern Recognition, pp. 2387-2395, 2016. 9 pages.
Deepfakes, "faceswap," GitHub.com, Aug. 14, 2020, Retrieved from the Internet:URL: https://github.com/deepfakes/, [retrieved on Jan. 25, 2022]. 10 pages.
J-Y. Zhu et al., "Unpaired image-to-image translation using cycle-consistent adversarial networks," In Proceedings of the IEEE international conference on computer vision, pp. 2223-2232, 2017. 10 pages.
J. Deng et al., "RetinaFace: Single-stage Dense Face Localisation in the Wild," arXiv:1905.00641v2, May 4, 2019. 10 pages.
Haoxiang Li et al.,"A convolutional neural network cascade for face detection," Computer Vision and Pattern Recognition, pp. 5325-5334, 2015. 10 pages.
Lichao Huang et al., "DenseBox: Unifying Landmark Localization with End to End Object Detection," arXiv:1509.04874v3, Sep. 19, 2015. 13 pages.
Shuo Yang et al., "Faceness-Net: Face Detection through Deep Facial Part Responses," arXiv:1701.08393v3, Aug. 25, 2017. 14 pages.
Kaipeng Zhan et al., "Joint Face Detection and Alignment Using Multi-task Cascaded Convolutional Networks," IEEE Signal Processing Letters, 2016. 5 pages.
H. Wang et al., "Face R-CNN," arXiv:1706.01061v1, Jun. 4, 2017. 10 pages.
H. Wang et al., "SSH: Single Stage Headless Face Detector," IEEE International Conference on Computer Vision (ICCV), pp. 4875-4884, 2017. 10 pages.
X. Tang et al., "PyramidBox: A Context-assisted Single Shot Face Detector," arXiv:1803.07737v2, Aug. 17, 2018. 21 pages.
F. N. Iandola et al., "SqueezeNet: AlexNet-level accuracy with 50x fewer parameters and< 0.5MB model size," arXiv:1602.07360v4, Nov. 4, 2016. 13 pages.
K. He et al., "Deep residual learning for image recognition," In Proceedings of the IEEE conference on computer vision and pattern recognition, pp. 770-778, 2016. 9 pages.
F. Iandola et al., "DenseNet: Implementing Efficient ConvNet Descriptor Pyramids," arXiv:1404.1869v1, Apr. 7, 2014. 11 pages.
S. Ren et al., "Faster R-CNN: Towards real-time object detection with region proposal networks," In Advances in neural information processing systems, 2015. 9 pages.
R. Girshick, "Faster R-CNN," In Proceedings of the IEEE international conference on computer vision, pp. 1440-1448, 2015. 9 pages.
K. He et al., "Mask R-CNN," In Proceedings of the IEEE international conference on computer vision, pp. 2961-2969, 2017. 9 pages.
J. Redmon et al., "You only look once: Unified, real-time object detection," In Proceedings of the IEEE conference on computer vision and pattern recognition, pp. 779-788, 2016. 10 pages.
J. Redmon et al., "YOLO9000: better, faster, stronger," In Proceedings of the IEEE conference on computer vision and pattern recognition, pp. 7263-7271, 2017. 9 pages.
J. Redmon et al., "YOLOv3: An incremental improvement," arXiv:1804.02767v1, Apr. 8, 2018. 6 pages.
Florian Schroff et al., "FaceNet: A unified embedding for face recognition and clustering," computer vision and pattern recognition, pp. 815-823, 2015. 9 pages.
Yaniv Taigman et al., "DeepFace: Closing the Gap to Human-Level Performance in Face Verification," computer vision and pattern recognition, 2014. 8 pages.
Yi Sun et al., "Deep Learning Face Representation from Predicting 10,000 Classes," computer vision and pattern recognition, 2014. 8 pages.
Yi Sun et al., "Deep Learning Face Representation by Joint Identification-Verification," neural information processing systems, 2014. 9 pages.
Yi Sun et al., "DeepID3: Face Recognition with Very Deep Neural Networks," Computer Vision and Pattern Recognition, 2015. 5 pages.
W. Liu et al., "Sphereface: Deep hypersphere embedding for face recognition," arXiv:1704.08063v1, Apr. 26, 2017. 9 pages.
J. Deng et al., "ArcFace: Additive Angular Margin Loss for Deep Face Recognition," arXiv:1801.07698v1, Jan. 23, 2018. 13 pages.
K. Sun et al., "Deep High-Resolution Representation Learning for Human Pose Estimation," arXiv:1902.09212v1, Feb. 25, 2019. 12 pages.
China National Intellectual Property Administration (CNIPA) Office Action 1 for 202010017583.4 Dec. 15, 2022 12 Pages (including translation).

\* cited by examiner

IMAGE RECOGNITION METHOD AND APPARATUS, COMPUTER-READABLE STORAGE MEDIUM, AND ELECTRONIC DEVICE

RELATED APPLICATIONS

This application is a continuation application of PCT Application No. PCT/CN2020/123903, filed on Oct. 27, 2020, which claims priority to Chinese Patent Application No. 202010017583.4, filed on Jan. 8, 2020. The two applications are both incorporated by reference in their entirety.

FIELD OF THE TECHNOLOGY

This application relates to the field of artificial intelligence (AI) technologies, and in particular, to an image recognition method, an image recognition apparatus, a computer-readable storage medium, and an electronic device.

BACKGROUND OF THE DISCLOSURE

With the emergence of various smart applications such as a beauty camera, dress changing software, and face changing software, people can use these smart applications for entertainment.

Taking face-changing as an example, because criminals use these smart applications to make fake videos to deceive the public, and even worse, use the fake videos for racketeering, spreading porno, violence, and terror, and disturbing politics, people worry about security risks and privacy crisis caused by the face-changing technologies. Therefore, it is necessary to accurately identify a real versus fake human face in a video. However, the recognition method in the related art cannot achieve accurate detection and identification.

Information disclosed in the foregoing background is merely used for describing the background of this application, and therefore may include information that does not constitute the related art known to a person of ordinary skill in the art.

SUMMARY

Embodiments of this application provide an image recognition method and apparatus, a computer-readable storage medium, and an electronic device, to at least improve the efficiency and accuracy of image recognition to some extent.

One aspect of this application provides an image recognition method. The method includes obtaining feature information corresponding to a target object in an image to be recognized, the feature information comprising any one or more of blur degree information, local feature information, and global feature information; determining a category of the target object based on the feature information, and determining a confidence level corresponding to the target object; and obtaining target information corresponding to the image to be recognized according to the category of the target object and the confidence level.

Another aspect of this application provides an image recognition apparatus. The apparatus includes a feature information obtaining module, configured to obtain feature information corresponding to a target object in an image to be recognized, the feature information comprising any one or more of blur degree information, local feature information, and global feature information; a confidence level obtaining module, configured to: determine a category of the target object based on the feature information, and determine a confidence level corresponding to the target object; and a target information obtaining module, configured to obtain target information corresponding to the image to be recognized according to the category of the target object and the confidence level.

An embodiment of this application provides a non-transitory computer-readable storage medium, storing a computer program. The program, when executed by a processor, causes the processor to perform the image recognition method according to the embodiments of this application.

An embodiment of this application provides an electronic device, including: one or more processors; and a storage apparatus, configured to store one or more programs, the one or more programs, when executed by the one or more processors, causing the one or more processors to perform the image recognition method according to the foregoing embodiment.

According to the image recognition method consistent with the embodiments of this application, the category of the target object and the confidence level corresponding to the target object are determined based on the feature information in at least one dimension; and the target information corresponding to the image to be recognized is obtained according to the category corresponding to the target object and the confidence level, to improve the efficiency and accuracy of image recognition, to perform real or fake identification on the target object such as a human face or a human body in an image or a video.

BRIEF DESCRIPTION OF THE DRAWINGS

Accompanying drawings herein are incorporated into the specification and constitute a part of this specification, show embodiments that conform to this application, and are used for describing a principle of this application together with this specification. Apparently, the accompanying drawings described below are merely some embodiments of this application, and a person of ordinary skill in the art may further obtain other accompanying drawings according to the accompanying drawings without creative efforts. In the accompanying drawings.

DESCRIPTION OF EMBODIMENTS

Exemplary implementations will now be described more thoroughly with reference to the accompanying drawings. However, the exemplary implementations may be implemented in various forms, and are not to be understood as being limited to the examples described herein. Instead, the implementations are provided to make this application more thorough and complete and fully convey the idea of the exemplary implementations to a person skilled in the art.

In addition, the described features, structures or characteristics may be combined in one or more embodiments in any appropriate manner. In the following descriptions, a lot of specific details are provided to give a comprehensive understanding of the embodiments of this application. However, a person of ordinary skill in the art is to be aware that, the technical solutions in this application may be implemented without one or more of the particular details, or another method, unit, apparatus, or step may be used. In other cases, well-known methods, apparatuses, implementations, or operations are not shown or described in detail, in order not to obscure the aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

Figure 1:
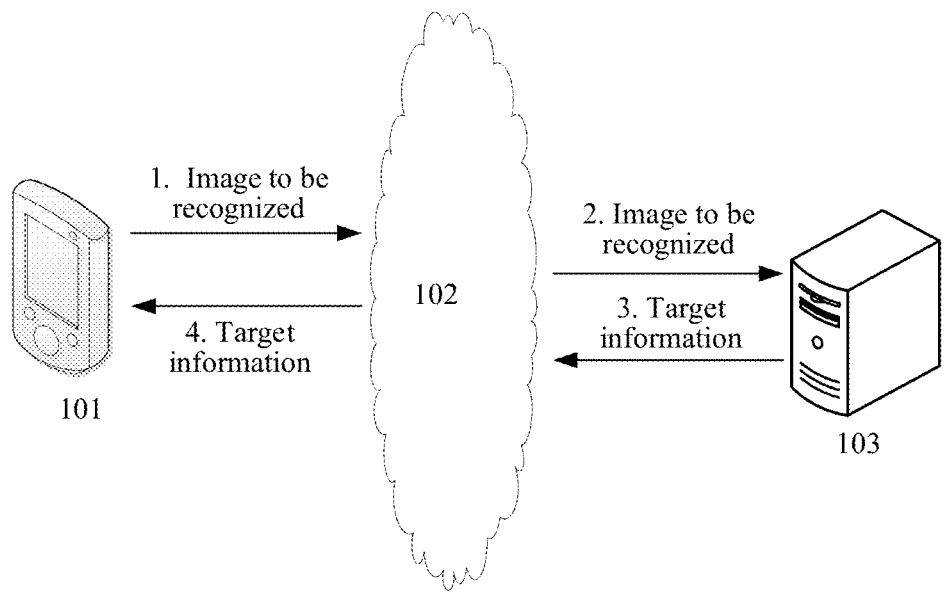
FIG. 1 is a schematic diagram of an application scenario of an image recognition system according to an embodiment of this application.

FIG. 1 is a schematic diagram of an application scenario of an image recognition system according to an embodiment of this application.

As shown in FIG. 1, the system architecture 100 may include a terminal device 101, a network 102, and a server 103. The network 102 is a medium used for providing a communication link between the terminal device 101 and the server 103. The network 102 may include various connection types, for example, a wired communication link and a wireless communication link.

It is to be understood that quantities of terminal devices, networks, and servers in FIG. 1 are merely exemplary. According to an actual requirement, there may be any quantity of terminal devices, networks, and servers. For example, the server 103 may be a server cluster including a plurality of servers. The terminal device 101 may be a device such as a tablet computer, a desktop computer, or a smartphone.

In some embodiments, the terminal device 101 may obtain a shot video uploaded by a user as a video to be recognized and use a video frame including a human face in the video to be recognized as an image to be recognized, and then the terminal device 101 may transmit the image to be recognized to the server 103 through the network 102. After obtaining the image to be recognized, the server 103 may perform real or fake identification on the human face (a target object) in the image to be recognized, that is, determine whether the target object is added later using an image processing technology rather than an object originally included in the image to be recognized. When determining that the human face in the image to be recognized is obtained by face-changing processing using an image processing technology, the server 103 continues to determine a risk value of the image to be recognized. If the risk value is within a specific range, the server 103 returns information prompting to reject uploading to the terminal device 101.

In some embodiments, in a recommendation system, the server 103 may detect an image to be recognized obtained in a recall phase and perform real or fake identification on a human face (a target object) in the image to be recognized, that is, determine whether the target object is added later using an image processing technology rather than an object originally included in the image to be recognized. When determining that the human face in the image to be recognized is obtained by face-changing processing using an image processing technology, the server 103 continues to determine a risk value of the image to be recognized. If the risk value is within a specific range, the server 103 removes the image to be recognized from a database used in the recall phase, to avoid recommending the image to be recognized to the user.

In some embodiments, the server 103 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an AI platform. The terminal device 101 may be a smartphone, a tablet computer, a notebook computer, a desktop computer, a smart speaker, a smartwatch, or the like, but is not limited thereto. The terminal device and the server may be directly or indirectly connected in a wired or wireless communication manner. This is not limited in the embodiments of this application.

In an embodiment of this application, the terminal device 101 may obtain a video to be recognized, and analyze the video to be recognized, to obtain an image including a target object, and use the image including the target object as an image to be recognized, or may directly obtain an image to be recognized including a target object, and then the terminal device 101 may transmit the image to be recognized to the server 103 through the network 102. After obtaining the image to be recognized, the server 103 may perform feature extraction on the target object in the image to be recognized, to obtain feature information corresponding to the target object. The feature information includes any one or more of blur degree information, local feature information, and global feature information. Then, the server 103 may determine a category of the target object based on the feature information, determine a confidence level corresponding to the target object, and perform real or fake identification on the target object in the image to be recognized according to the category of the target object and the confidence level, that is, determine whether the target object is added later using an image processing technology rather than an object originally included in the image to be recognized. Finally, the server 103 may calculate a risk value of the image to be recognized according to the obtained confidence level, and obtain target information based on the risk value. The target information may specifically include information such as whether the target object is fake, whether a portrait of a celebrity is used, and a risk value. The information included in the target information varies according to different tasks. If it is determined that a risk exists in the image to be recognized or the video to be recognized, an operation such as removing needs to be performed on the image to be recognized or the video to be recognized. In the technical solutions of the embodiments of this application, multi-directional and multi-level analysis can be performed on the image to be recognized or the video to be recognized, to greatly improve the efficiency and accuracy of image recognition.

The image recognition method provided in the embodiments of this application may be performed by a server, and correspondingly, the image recognition apparatus may be disposed in the server. However, in some embodiments, the image recognition method provided in the embodiments of this application may be alternatively performed by a terminal device.

Using performing real or fake detection and recognition on a human face in an image as an example, first, human face detection may be performed on the image, then the human face is detected according to a fake face model, and the fake face model is a classifier based on a feature vector. The method is used for a fake face in a scenario of human face verification, for example, a static portrait in a picture is greatly different from a human face generated using an AI technology, and a fake face video generated using an AI technology varies greatly and has a great feature difference and unstable quality. Therefore, performing real or fake identification on an image and a video only using a single method leads to problems of a high false detection rate and a high misdetection rate. The recognition method for a real or fake human face in the related art is simple and cannot cover a fake face image or video generated using various face-changing algorithms. Therefore, it is difficult to accurately detect a fake face generated using various face-changing technologies based on AI.

In view of the problem existing in the related art, the embodiments of this application provide an image recognition method. The image recognition method is implemented based on machine learning, and the machine learning is a type of AI. AI is a theory, a method, a technology, and an application system that use a digital computer or a machine controlled by a digital computer to simulate, extend, and expand human intelligence, perceive an environment, obtain knowledge, and use the knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

Computer vision (CV) is a science that studies how to enable a machine to "see", and to be specific, to implement machine vision such as recognition, tracking, and measurement for a target by using a camera and a computer in replacement of human eyes, and further perform graphics processing, so that the computer processes the target into an image more suitable for human eyes to observe, or more suitable to be transmitted to an instrument for detection. As a scientific discipline, CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, and map construction, and further include biometric feature recognition technologies such as human face recognition and fingerprint recognition.

Machine learning (ML) is a multi-field interdisciplinary field and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

With the research and progress of the AI technology, the AI technology is studied and applied in a plurality of fields such as a smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied in more fields, and play an increasingly important role.

The solutions provided in the embodiments of this application involve an image recognition technology of AI, and are described in detail through the following embodiments.

The embodiments of this application provide an image recognition method. The following uses recognition of a human face in an image to be recognized as an example, to describe the implementation details of the solutions of the embodiments of this application in detail.

In some embodiments, by using the image recognition method provided in the embodiments of this application, a human face in the image to be recognized may be detected, an animal face in the image to be recognized may be detected, and an item object in the image to be recognized may also be detected.

Figure 2:
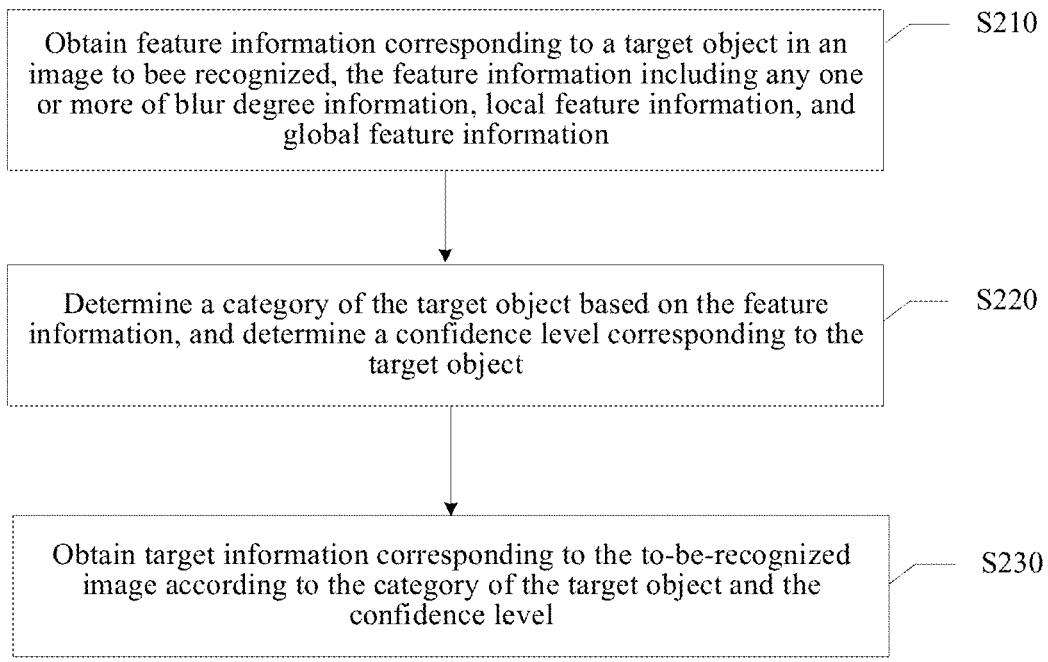
FIG. 2 is a schematic flowchart of an image recognition method according to an embodiment of this application.

FIG. 2 is a schematic flowchart of an image recognition method according to an embodiment of this application. The image recognition method may be performed by a server, and the server may be the server 103 shown in FIG. 1. With reference to FIG. 2, the image recognition method includes at least step S210 to step S230, which are described in detail as follows:

In step S210, feature information corresponding to a target object in an image to be recognized is obtained, the feature information including any one or more of blur degree information, local feature information, and global feature information.

In some embodiments, the image to be recognized is an image including a human face needing to be identified, where the human face is a target object. The image to be recognized may be an image including a human face locally stored by a terminal device, or may be an image including a human face obtained from a network. The image to be recognized may be alternatively obtained by processing a video to be recognized. Specifically, the video to be recognized may be decoded using a video coding-decoding technology, for example, methods such as video and audio losing compression standard: MPEG-2, MPEG-4, and H.264 made by a moving picture expert group (MPEG) may be used, the video to be recognized is analyzed to image frames, and an image frame including a human face in the image frames is used as an image to be recognized, or a frame selected from all image frames including a human face is used as the image to be recognized.

In some embodiments, a low-level feature and a high-level feature corresponding to the image to be recognized may be extracted, where the low-level feature may be information at a pixel level and a texture level of the image, and the high-level feature may be local feature information or global feature information of the image. In the embodiments of this application, feature information corresponding to the image to be recognized is blur degree information, local feature information, and global feature information in a low-to-high order. A category of the image to be recognized may be determined according to any one of the three pieces of feature information, or a category of the image to be recognized may be determined according to a plurality of the three pieces of feature information, and the category of the image to be recognized is a real or fake human face in the image to be recognized.

A face-changing technology in the related art is first to generate a human face region similar to an expression and an action in a target task in an image or a video, and then to embed a fake face synthesized using image fusing and human face fusing technologies to a target human face. However, the limitation of these methods lies in that because resolution of the synthesized human face region is different from that of the original video, a relatively great difference exists between the human face region of a synthesized video and an original real image and video at an image low-level feature level, such as a color, an edge contour, texture, a light intensity, and a definition. The synthesized video usually has a feature such as a blurred edge, a lack of changes of texture in different regions, and low resolution. Therefore, in the embodiments of this application, blur degree analysis may be first performed on a human face region and a human body region in a video, which includes a feature difference therebetween in aspects such as the texture, the edge contour, and the definition, and real or fake determining is performed on the human face in the image and the video using a classification threshold. Because the blur degree information is the low-level feature of the image and is easy to be obtained, if a real or fake human face is detected through the blur degree information, human face recognition does not need to be performed according to the high-level feature of the image, thereby improving the recognition efficiency and saving time and resources.

Figure 3:
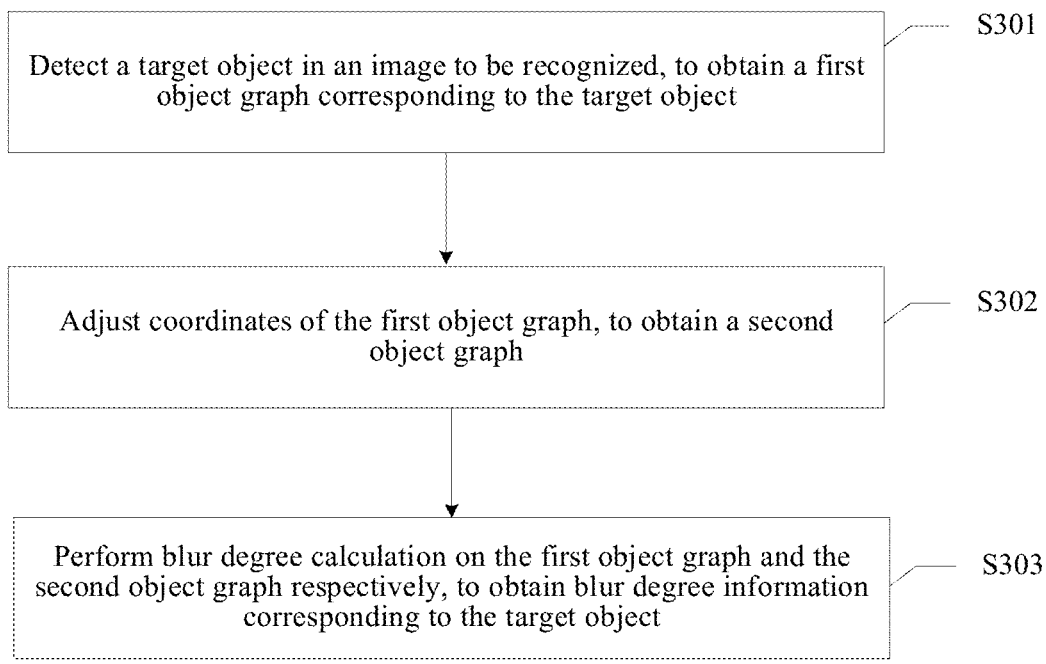
FIG. 3 is a schematic flowchart of an image recognition method according to an embodiment of this application.

In some embodiments, FIG. 3 is a schematic flowchart of an image recognition method according to an embodiment of this application. As shown in FIG. 3, the process includes at least step S301 to step S303 specifically as follows:

In step S301, a target object in an image to be recognized is detected, to obtain a first object graph corresponding to the target object.

In some embodiments, before blur degree information of the image to be recognized is obtained, a human face region in the image to be recognized needs to be detected, to obtain a first object graph corresponding to the human face region. Specifically, the human face in the image to be recognized may be detected based on a human face detection algorithm, to obtain human face coordinate frame information, the human face region may be further determined according to the human face coordinate frame information, and the first object graph including human face region information is obtained. The human face in the image to be recognized may be detected using a model based on a feature pyramid network architecture, to obtain human face coordinate frame information. The human face coordinate frame information specifically includes coordinates (x, y) of a start point at an upper-left corner of the human face region and further includes a width and a height of a bounding box of the human face region, that is, the human face coordinate frame information is (x, y, width, height). The first object graph includes human face information only and does not include background information in the image to be recognized.

In some embodiments, the human face in the image to be recognized may be alternatively detected using another human face detection algorithm, for example, a cascade convolutional neural network (Cascade CNN), a DenseBox, a human face detection network (Faceness-Net), a face region-convolutional neural network (Face R-CNN), or a multi-task convolutional neural network (MTCNN), to obtain the human face coordinate frame information. This is not specifically limited in the embodiments of this application.

In step S302, coordinates of the first object graph are adjusted, to obtain a second object graph.

In an embodiment of this application, because the blur degree analysis needs to be performed on the human face region and the human body region, the second object graph corresponding to the human body region needs to be further obtained. However, considering that the complicated background in the image to be recognized, if the image to be recognized is directly used as the second object graph, the accuracy of a final determining result is affected due to excessive noise. Therefore, in the embodiments of this application, the coordinates of the first object graph may be enlarged, to obtain a second object graph including a part of the background. Specifically, a width and a height of the first object graph may be extended by ¼ times or may be extended by other times. This is not specifically limited in the embodiments of this application.

In step S303, blur degree calculation is performed on the first object graph and the second object graph respectively, to obtain blur degree information corresponding to the target object.

In some embodiments, after the first object graph and the second object graph are obtained, a first blur degree $S_{face}$ corresponding to the first object graph and a second blur degree $S_{bg}$ corresponding to the second object graph may be calculated respectively using the Laplace operator. When the blur degree is calculated, first, the Gaussian filtering and noise removal may be performed on the first object graph and the second object graph; then, the first object graph and the second object graph that are filtered are converted to grayscale images; next, convolution is performed on the grayscale image corresponding to the first object graph and the grayscale image corresponding to the second object graph respectively using the Laplace operator; and finally, a variance is calculated according to the feature information obtained after the convolution, to obtain the first blur degree $S_{face}$ and the second blur degree $S_{bg}$. The first blur degree $S_{face}$ and the second blur degree $S_{bg}$ are the blur degree information corresponding to the human face in the target object.

In some embodiments, image recognition may be performed according to local feature information corresponding to the target object. First, the local feature information corresponding to the target object may be obtained, and then, the category of the target object is determined according to the local feature information. When the local feature information corresponding to the target object is extracted, the first object graph may be inputted to a first image recognition model, and feature extraction is performed on the first object graph using the first image recognition model, to obtain the local feature information; and classification processing is performed on the target object according to the local feature information, to obtain the category of the target object. The first image recognition model may be various network models used for extracting an image feature, for example, a convolution neural network such as an ResNet, an Inception, a SqueezeNet, or a DenseNet. Using the SqueezeNet network as an example, before the first object graph is inputted to the SqueezeNet network, the first object graph may be scaled into a pixel of 224*224, to match an input of the SqueezeNet network; then, the scaled first object graph is inputted to the SqueezeNet network, and feature extraction is performed on the scaled first object graph using the SqueezeNet network, to obtain the local feature information, that is, human face feature information; and finally, real or fake identification is performed on the human face according to the human face feature information.

In some embodiments, image recognition may be alternatively performed according to global feature information corresponding to the target object. First, feature extraction may be performed on the image to be recognized to obtain the global feature information corresponding to the target object, and then, the category of the target object and the confidence level corresponding to the target object are determined according to the global feature information. When the global feature information is extracted, the image to be recognized may be inputted to a second image recognition model, and feature extraction is performed on the image to be recognized using the second image recognition model, to obtain the global feature information. The second image recognition model may also be various network models used for extracting an image feature, such as a faster region-convolutional neural network (Faster R-CNN), a faster region-convolutional neural network (Fast R-CNN), a mask region-convolutional neural network (Mask R-CNN), a YOLO, a YOLOv2, or a YOLOv3.

In step S220, a category of the target object is determined based on the feature information, and a confidence level corresponding to the target object is determined.

In some embodiments, after the first blur degree $S_{face}$ and the second blur degree $S_{bg}$ are obtained, the second blur degree may be divided by the first blur degree, to obtain a blur degree ratio p, and $p=S_{bg}/S_{face}$; then, the blur degree ratio is compared with a classification threshold, and when the blur degree ratio is less than or equal to the classification threshold, the category of the target object is determined to be real, that is, the human face in the image to be recognized is a real face; and when the blur degree ratio is greater than the classification threshold, the category of the target object is determined to be fake, that is, the human face in the image to be recognized is a fake face. The classification threshold is an adaptive classification threshold obtained according to human face recognition results of all image frames in a plurality of videos.

In some embodiments, if the human face image in the image is a human face image obtained by directly capturing a human face, the human face in the human face image is a real face, and if the human face image in the image is obtained by changing the real face using the AI technology, the human face in the human face image is a fake face. For example, the human face image of Li in an image is changed to the human face image of Zhang using the face-changing technology based on AI, the human face image of Li is a real face, and the human face image of Zhang is a fake face.

In some embodiments, when the category of the target object is determined to be fake according to the blur degree information, the category may be determined as a fake first confidence level according to the blur degree ratio and the classification threshold, the calculation formula is shown as a formula (1) specifically as follows:

$$\text{conf-level1-fake}=(p-p_{boarder})/p \times 0.5+0.5 \quad (1)$$

where conf-level1-fake is the first confidence level, p is the blur degree ratio, and $p_{boarder}$ is the classification threshold.

In some embodiments, the category of the target object may be determined according to the local feature information corresponding to the target object. After the first object graph is inputted to the first image recognition model and feature extraction is performed on the first object graph using the first image recognition model, the local feature information of the image to be recognized may be obtained, and the local feature information is the human face feature information. A second confidence level conf-level2-fake and a third confidence level conf-level2-real corresponding to the human face may be obtained based on the human face feature information, where the second confidence level conf-level2-fake is a probability value that the category of the human face is fake and that is outputted by the first image recognition model, and the third confidence level conf-level2-real is a probability value that the category of the human face is real and that is outputted by the first image recognition model. When the second confidence level conf-level2-fake is greater than the third confidence level conf-level2-real, the human face in the image to be recognized is determined to be a fake face; and when the second confidence level conf-level2-fake is less than or equal to the third confidence level conf-level2-real, the human face in the image to be recognized is determined to be a real face. Compared with the blur degree information, the local feature information is more accurate and belongs to the high-level feature in the image information. Image recognition based on the local feature information can further improve the accuracy of the image recognition, and the accuracy of human face recognition is higher.

In some embodiments, the image recognition may be alternatively performed according to the global feature information corresponding to the target object. Specifically, the category of the target object and the confidence level corresponding to the target object are determined based on the global feature information. After feature extraction is performed on the image to be recognized using the second image recognition model, to obtain the global feature information, regression calculation may be performed on a region corresponding to the target object, to obtain the category of the target object and the confidence level corresponding to the target object. A fourth confidence level conf-level3-fake and a fifth confidence level conf-level3-real corresponding to the target object may be obtained by performing regression calculation on the region corresponding to the target object according to the global feature information, where the fourth confidence level conf-level3-fake is a probability value that the category of the target object is fake and that is outputted by the second image recognition model, and the fifth confidence level conf-level3-real is a probability value that the category of the target object is real and that is outputted by the second image recognition model. Similarly, when the fourth confidence level conf-level3-fake is greater than the fifth confidence level conf-level3-real, it indicates that the human face in the image to be recognized is a fake face; and in case that the fourth confidence level conf-level3-fake is less than or equal to the fifth confidence level conf-level3-real, it indicates that the human face in the image to be recognized is a real face. By extracting the global feature information, a contextual relationship between the human face and the background can be fully considered, and a difference between the human face region and the background can be used, to perform real or fake identification on the human face, and improve the accuracy of human face recognition.

In some embodiments, when the local feature information or the global feature information in the image to be recognized is extracted, to obtain confidence levels corresponding to target objects of different categories, only one image recognition model may be used, or a set of a plurality of image recognition models may be used. When the set of a plurality of image recognition models is used, all image recognition models in the set may be used to perform feature extraction on the image to be recognized, and the confidence levels corresponding to the target objects of different categories are outputted based on the obtained feature information, where the confidence levels include a confidence level when the target object is real and a confidence level when the target object is fake; and after the confidence levels outputted by the image recognition models are obtained, all the confidence levels when the target object is real are added up, to obtain a final confidence level when the target object is real. Similarly, all the confidence levels when the target object is fake are added up, to obtain a final confidence level when the target object is fake.

In some embodiments, to improve the efficiency and accuracy of image recognition, real or fake identification may be performed on the human face based on the feature information from low-level to high-level corresponding to the image to be recognized. When real or fake identification is performed on the human face, whether to obtain next feature information needs to be determined according to a recognition result corresponding to previous feature information, and real or fake identification is performed on the human face according to the next feature information. Specifically, first, the blur degree information corresponding to the target object is obtained, and the category of the target object is determined according to the blur degree information and the classification threshold; when the category of the target object is determined to be real according to the blur degree information and the classification threshold, the local feature information corresponding to the target object is obtained, and the category of the target object is determined based on the local feature information; and when the category of the target object is determined to be real based on the local feature information, the global feature information corresponding to the target object is obtained, and the category of the target object and the confidence level corresponding to the target object are determined based on the global feature information, to obtain the target information corresponding to the image to be recognized according to the confidence level. That is, when the category of the target object in the image to be recognized is determined to be fake according to the feature information at a certain level, the determining is stopped, thereby saving time and resources. The specific processes of determining the category of the target object according to the blur degree information and the classification threshold, determining the category of the target object according to the local feature information, determining the category of the target object according to the global feature information are the same as those in the foregoing embodiments, and details are not described in the embodiments of this application again.

In some embodiments, when the target object in the image to be recognized is identified according to the blur degree information, the local feature information, and the global feature information in sequence, until the category of the target object is determined to be fake or the category of the target object is determined to be real based on all the feature information, the determining is stopped and determining information is outputted. Specifically, when the category of the target object is determined to be fake according to the blur degree information, the determining is stopped; when the category of the target object is determined to be real according to the blur degree information while the category of the target object is determined to be fake according to the local feature information, the determining is stopped; and when the category of the target object is determined to be real according to the local feature information while the category of the target object is determined to be fake according to the global feature information, the determining is stopped. When the target object in the image to be recognized is determined to be real according to the feature information from low-level to high-level, the target object in the image to be recognized may be determined to be real, and the target information of "real face, safe" is outputted.

In step S230, target information corresponding to the image to be recognized is obtained according to the category of the target object and the confidence level.

In some embodiments, when real or fake identification is performed on the target object according to the feature information from low-level to high-level corresponding to the image to be recognized, when the category of the target object is determined to be fake according to the feature information at a certain level, a corresponding confidence level is obtained, and a risk value of the image to be recognized is calculated according to the confidence level, to obtain the target information, and the target information is information prompting whether a risk exists in the image to be recognized. For example, the target information may include whether the human face is a fake face and a risk value. According to different tasks, the target information may further include other information such as whether a human face of a celebrity is used. Specifically, when the category of the target object is determined to be fake according to the blur degree information and the classification threshold, the risk value corresponding to the image to be recognized is determined according to the first confidence level, and the target information is obtained according to the category of the target object and the risk value; or when the category of the target object is determined to be fake according to the local feature information, the risk value corresponding to the image to be recognized is determined according to the second confidence level, and the target information is obtained based on the category of the target object and the risk value; or when the category of the target object is determined to be fake according to the global feature information, the risk value corresponding to the image to be recognized is determined according to the fourth confidence level, and the target information is obtained based on the category of the target object and the risk value. For example, when the human face in the image to be recognized is determined to be a real face according to the blur degree information and the local feature information, and the human face in the image to be recognized is determined to be a fake face according to the global feature information, the corresponding confidence level of 0.7 may be obtained, the risk value of the image to be recognized may be determined to be 0.7 according to the confidence level, and the final target information is "fake face, risk value: 0.7".

In some embodiments, in addition to performing real or fake identification on the target object in the image to be recognized, whether the target object in the image to be recognized is the same as a celebrity may be further determined, to protect the interest of the celebrity, and prevent lawbreakers from deceiving the society or doing other behaviors that endanger the society through a fake video produced using the image of the celebrity. When the category of the target object is determined to be fake according to the blur degree information, the local feature information, or the global feature information, the target object in the image to be recognized may be matched with an object to be matched in a material database, to obtain a matching result, to determine whether the human face in the image to be recognized uses the human face information of the celebrity.

In an embodiment of this application, the target information may be further obtained according to the category of the target object, the target confidence level, and the matching result of the human face of the celebrity. Specifically, when the category of the target object is determined to be fake according to the blur degree information and the classification threshold, the target object is matched with the object to be matched in the material database, to obtain the matching result, to obtain the target information according to the category of the target object, the target confidence level, and the matching result; or when the category of the target object is determined to be fake according to the local feature information, the target object is matched with the object to be matched in the material database, to obtain the matching result, to obtain the target information according to the category of the target object, the target confidence level, and the matching result; or when the category of the target object is determined to be fake according to the global feature information, the target object is matched with the object to be matched in the material database, to obtain the matching result, to obtain the target information according to the category of the target object, the target confidence level, and the matching result.

Figure 4:
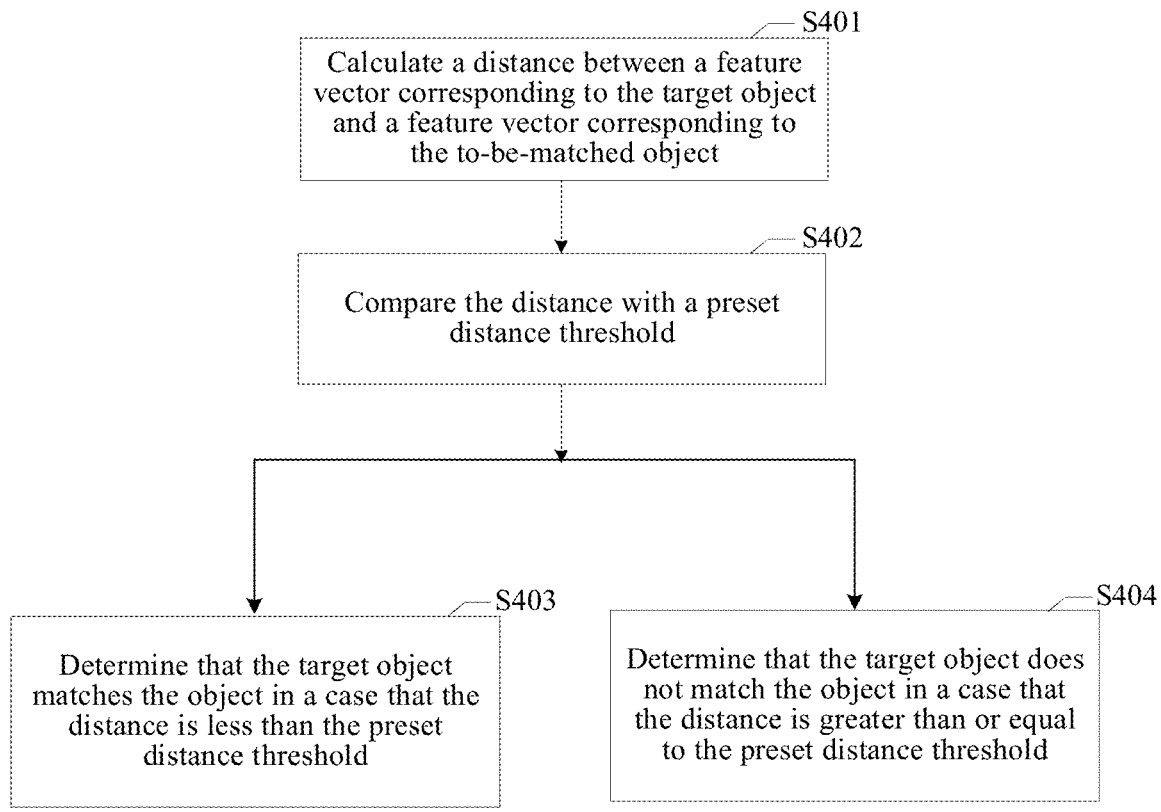
FIG. 4 is a schematic flowchart of an image recognition method according to an embodiment of this application.

In some embodiments, the material database includes human face feature vectors of a plurality of celebrities. FIG. 4 is a schematic flowchart of an image recognition method according to an embodiment of this application. As shown in FIG. 4, in step S401, a distance between a feature vector corresponding to the target object and a feature vector corresponding to the object to be matched is calculated; in step S402, the distance is compared with a preset distance threshold; in step S403, it is determined that there is a matching relationship between the target object and the object to be matched when the distance is less than the preset distance threshold; and in step S404, it is determined that there is no matching relationship between the target object and the object to be matched when the distance is greater than or equal to the preset distance threshold.

In step S401, the feature vector corresponding to the target object may be obtained by performing feature extraction on the first object graph determined according to the target object coordinate frame information through a feature extraction network. Specifically, the feature extraction network may be a network such as a FaceNet, a DeepFace, a DeepID, a SphereFace, an ARCFace, and this is not specifically limited in the embodiments of this application. The distance may be a Euclidean distance, a Mahalanobis distance, a Manhattan distance, or the like, and this is not specifically limited in the embodiments of this application. Using the Euclidean distance as an example, the distance between the feature vector corresponding to the human face in the image to be recognized and the feature vector corresponding to the human face of the celebrity in the material database may be calculated according to a formula (2) specifically as follows:

$$dist(X, Y_i) = \sqrt{\sum_{k=1}^{N} (X_k - Y_{ik})^2} \qquad (2)$$

where dist $(X, Y_i)$ is the distance between the feature vector corresponding to the human face in the image to be recognized and the feature vector corresponding to the human face of the celebrity in the material database, $X_k$ is a component in the feature vector corresponding to the human face in the image to be recognized, $Y_{ik}$ is a component in the feature vector corresponding to the human face of the celebrity, k is a $k^{th}$ component in the feature vector, and N is a total quantity of components in the feature vectors.

In some embodiments, a dimension of the feature vector corresponding to the human face in the image to be recognized is the same as a dimension of the feature vector corresponding to the human face of the celebrity. Using an output of the Facenet as an example, the feature vector of the human face in the image to be recognized is a 512-dimensional feature vector $X=[x_1, x_2, x_3, \ldots x_{512}]$, and correspondingly, the feature vector of the human face of the celebrity is also a 512-dimensional feature vector $Y_i=[y_{i1}, y_{i2}, y_{i3}, \ldots y_{i512}]$.

In some embodiments, in step S402, the preset distance threshold may be a distance value set according to an actual situation, and in engineering, the preset distance threshold may be set as 0.3 or 0.35. When the distance between the feature vector corresponding to the human face in the image to be recognized and the feature vector corresponding to the human face of the celebrity in the material database is less than the preset distance threshold, it indicates that the human face in the image to be recognized is the theft of the portrait of the celebrity.

In some embodiments, when there is the matching relationship between the target object and the object to be matched, a sixth confidence level may be determined according to the distance between the feature vector corresponding to the human face in the image to be recognized and the feature vector corresponding to the human face of the celebrity in the material database, and the sixth confidence level may be obtained according to a formula (3) specifically as follows:

$$conf - \text{celebrity} = 1.0 - \frac{1.0}{1.0 + dist(X, Y_i)} \qquad (3)$$

where conf-celebrity is the sixth confidence level, and dist$(X, Y_i)$ is the distance between the feature vector corresponding to the human face in the image to be recognized and the feature vector corresponding to the human face of the celebrity in the material database.

Figure 5:
FIG. 5 is a schematic diagram of an interface of target information of an image recognition method according to an embodiment of this application.

Further, the risk value of the image to be recognized may be calculated according to the sixth confidence level and the target confidence level, to obtain the target information. The target confidence level is a confidence level corresponding to the target object obtained when the category of the target object is determined to be fake according to the blur degree information, the local feature information, or the global feature information, and the confidence level may be specifically the first confidence level, the second confidence level, or the fourth confidence level in the foregoing embodiments. That is, the risk value is determined according to both the fake face confidence level conf-fake determined according to the blur degree information, the local feature information, or the global feature information, and the confidence level conf-celebrity determined according to comparison with the human face of the celebrity. When the human face in the image to be recognized is determined to be a fake face according to the blur degree information, conf-fake=conf-level1-fake; when the human face in the image to be recognized is determined to be a fake face according to the local feature information, conf-fake=conf-level2-fake; and when the human face in the image to be recognized is determined to be a fake face according to the global feature information, conf-fake=conf-level3-fake. When the risk value is calculated, the target confidence level and the sixth confidence level may be summed, specifically, the risk value conf-danger=conf-fake+conf-celebrity. A larger value of the conf-danger indicates that the risk is larger. Finally, the target information may be determined according to the risk value, and the target information may include information in three aspects: whether the human face is a fake face, whether a human face of a celebrity is used, and a risk value. FIG. 5 is a schematic diagram of an interface of target information of an image recognition method according to an embodiment of this application. As shown in FIG. 5, the target information of "fake face; human face of celebrity not used; risk value: 0.65" is displayed above an annotation box of the human face in the image to be recognized, which indicates that the human face in the image to be recognized is a fake face.

Further, the level the risk belongs to may be determined according to the risk value. Specifically, a plurality of levels may be set, and each of the levels corresponds to a different risk value range. For example, three levels: a high risk, a medium risk, and a low risk are set, the risk value is determined to be the high risk when in (0.7, 1], the risk value is determined to be the medium risk when in (0.3, 0.7], and the risk value is determined to be the low risk when in (0, 0.3]. The risk value range may alternatively be another numerical range. Finally, the target information may be determined and outputted according to the risk level, and the target information varies according to different risk levels. For example, when the risk level is the high risk, the target information is "fake face; human face of celebrity used; high risk"; and when the risk level is the low risk, the target information is "fake face; human face of celebrity not used; low risk". In addition, the target information may alternatively be in another form, and this is not specifically limited in the embodiments of this application.

The image recognition method in the embodiments of this application may be applied to a plurality of scenarios such as living body detection and sensitive video detection. The living body detection is mainly applied to fields such as transportation, finance, and insurance. For example, when a passenger takes a transport means such as a train and an airplane, detection and recognition need to be performed on the human face of the passenger to determine that information of the passenger is correct, and no danger exists. The sensitive video detection is mainly applied to an online video. For example, a video appears online, of which content is that a celebrity delivers an improper comment, and in order to determine whether the video is a synthesized video and protect the interest of the celebrity, detection and recognition need to be performed on the human face of the video.

Figure 6:
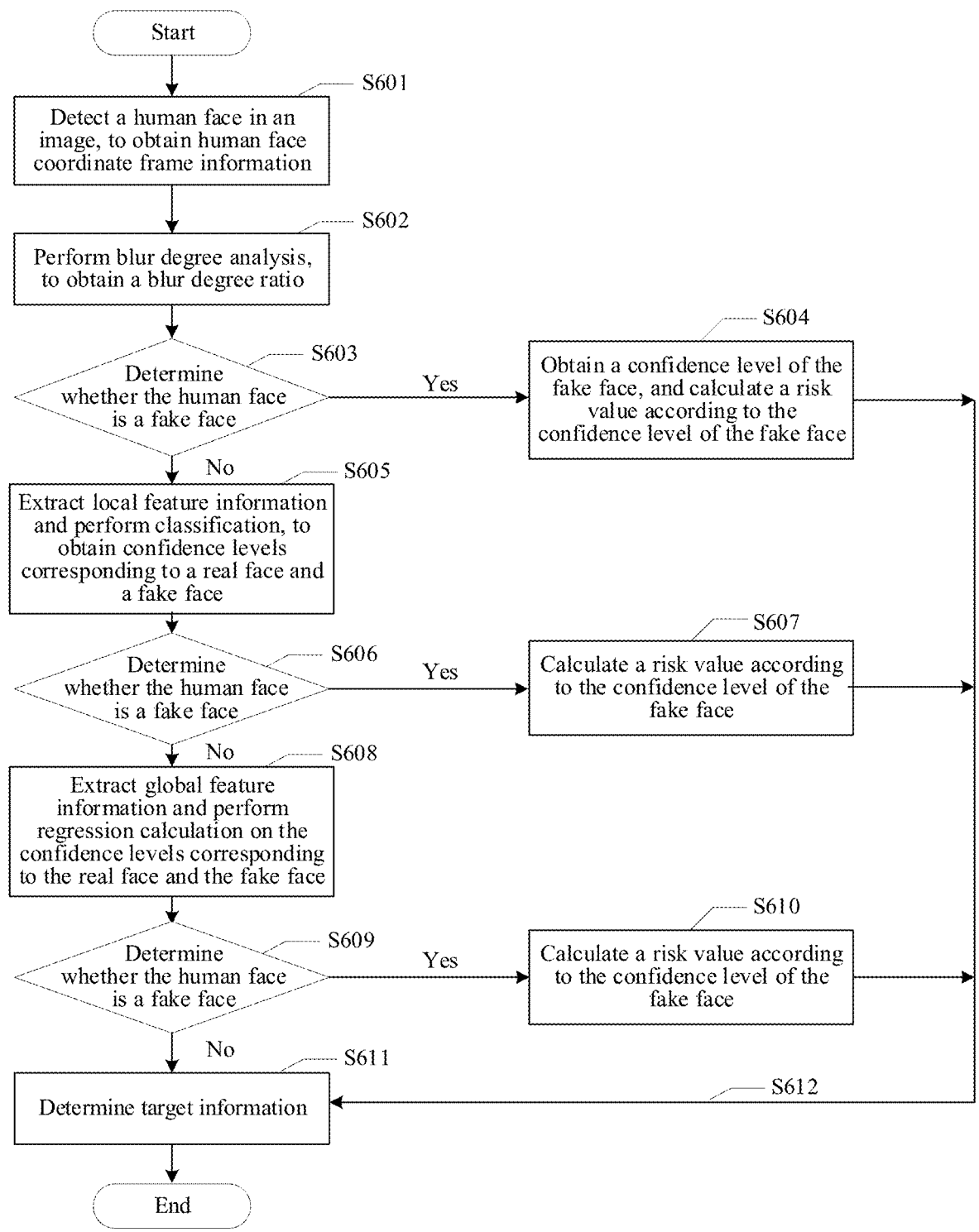
FIG. 6 is a schematic flowchart of detecting and recognizing a human face in an image recognition method according to an embodiment of this application.

Using the living body detection as an example, a terminal device shoots the head or the upper part of the body of a user, and then uploads the shot image or video to a back-end server, and the back-end server detects and recognize the human face in the image or the video, and returns target information obtained by detecting and recognizing the human face to the terminal device. When the target information prompts that the human face is a fake face, a warning is provided, and when the target information prompts that the human face is a real face, a subsequent process of living body verification is continued, to further determine legitimacy of the living body. FIG. 6 is a schematic flowchart of detecting and recognizing a human face in an image recognition method according to an embodiment of this application. As shown in FIG. 6, in step S601, a human face in an image is detected, to obtain human face coordinate frame information; in step S602, blur degree analysis is performed on a human face image determined according to the human face coordinate frame information, to obtain a blur degree ratio; in step S603, whether the human face in the image is a fake face is determined according to a magnitude relationship between the blur degree ratio and a classification threshold; in step S604, when the human face is determined to be a fake face, a confidence level of the fake face is obtained, and a risk value is calculated according to the confidence level of the fake face; in step S605, when the human face is determined to be a real face, local feature information is extracted from the human face image determined according to the human face coordinate frame information, and classification is performed according to the local feature information, to obtain a confidence level when the human face is a real face and a confidence level when the human face is a fake face; in step S606, whether the human face is a fake face is determined according to the confidence level of the real face and the confidence level of the fake face; in step S607, when the human face is determined to be a fake face, a risk value is calculated according to the confidence level of the fake face; in step S608, when the human face in determined to be a real face, feature extraction is performed on an image to be recognized to obtain global feature information, regression calculation is performed on the human face region according to the global feature information, and the real or fake human face and corresponding confidence levels are calculated; in step S609, whether the human face is a fake face is determined according to the confidence level of the real face and the confidence level of the fake face; in step S610, when the human face is determined to be a fake face, the risk value is calculated according to the confidence level of the fake face; in step S611, when the human face is determined to be a real face, the target information is determined; and in step S612, the target information is determined according to the risk values in step S604, step S607, and step S609. The specific execution process of the steps is the same as the specific execution process of the corresponding operations in the embodiments of this application, and details are not described herein again.

Using the sensitive video detection as an example, a user transmits a sensitive video to the back-end server through the terminal device, and the back-end server detects and recognizes a human face in the video, determines whether the human face in the video is a human face of a celebrity, and finally returns target information determined according to the detection and the recognition of the human face and a determining result of the celebrity to the terminal device. Different operations may be performed on the sensitive video according to different target information. Specifically, when the target information prompts that a risk level of the sensitive video is relatively high and a human face of a celebrity is used, the sensitive video may be removed and related path information is completely deleted; and when the target information prompts that a risk level of the sensitive video is no risk or relatively low and no human face of a celebrity is used, no processing may be performed, or, monitoring and warning are performed on the user uploading the sensitive video.

Figure 7:
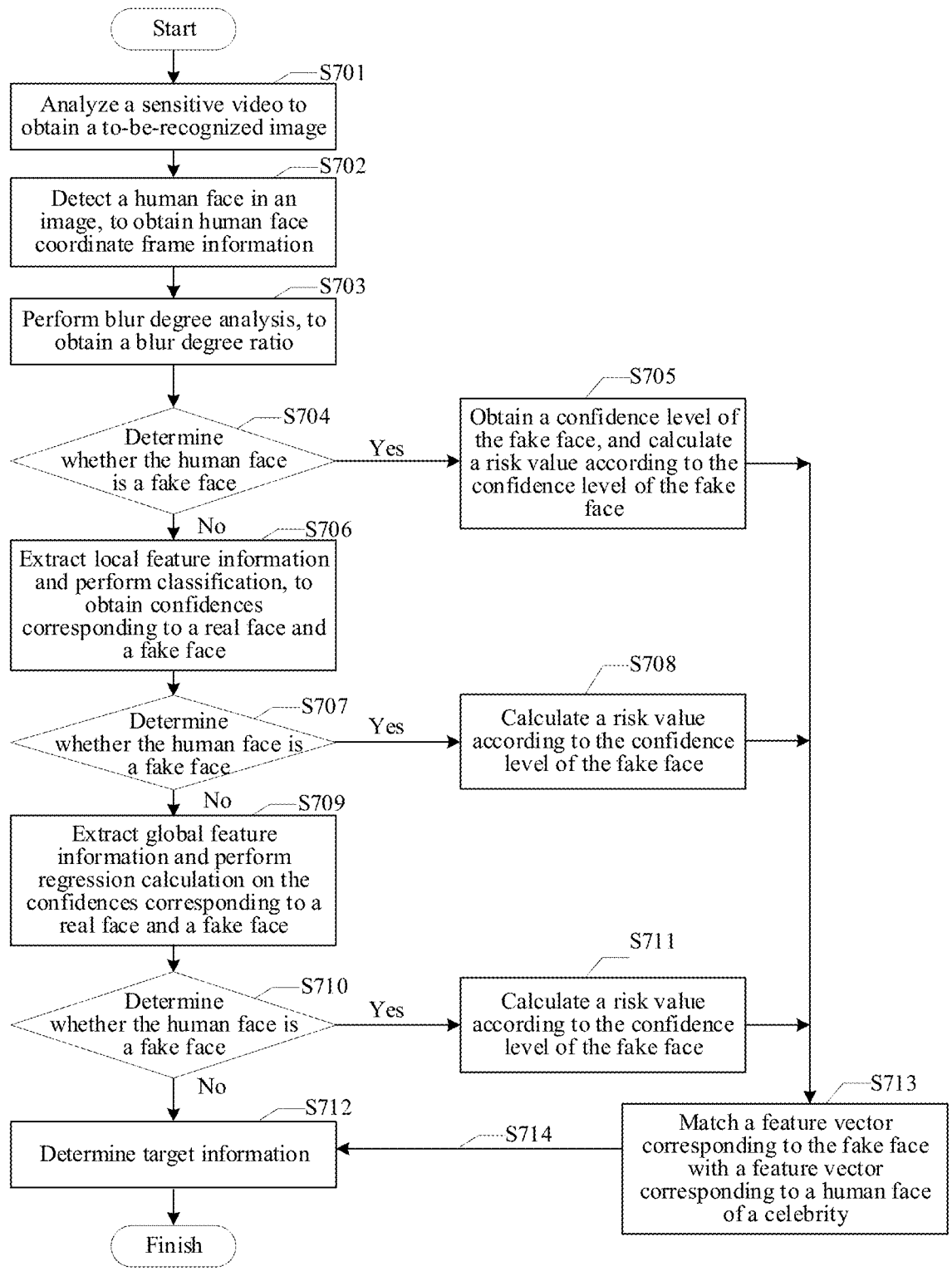
FIG. 7 is a schematic flowchart of detecting and recognizing a human face in a sensitive video in an image recognition method according to an embodiment of this application.

FIG. 7 is a schematic flowchart of detecting and recognizing a human face in a sensitive video in an image recognition method according to an embodiment of this application. As shown in FIG. 7, in step S701, the sensitive video is analyzed to obtain video frames, and a frame including a human face in the video frames is selected as an image to be recognized; in step S702, the human face in the image to be recognized is detected, to obtain human face coordinate frame information; in step S703, blur degree analysis is performed on a human face image determined according to the human face coordinate frame information, to obtain a blur degree ratio; in step S704, whether the human face in the image is a fake face is determined according to a magnitude relationship between the blur degree ratio and a classification threshold; in step S705, when the human face is determined to be a fake face, a confidence level of the fake face is obtained, and a risk value is calculated according to the confidence level of the fake face; in step S706, when the human face is determined to be a real face, local feature information is extracted from the human face image determined according to the human face coordinate frame information, and classification is performed according to the local feature information, to obtain a confidence level when the human face is a real face and a confidence level when the human face is a fake face; in step S707, whether the human face is a fake face is determined according to the confidence level of the real face and the confidence level of the fake face; in step S708, when the human face is determined to be a fake face, a risk value is calculated according to the confidence level of the fake face; in step S709, when the human face in determined to be a real face, feature extraction is performed on the image to be recognized to obtain global feature information, regression calculation is performed on the human face region according to the global feature information, and the real or fake human face and corresponding confidence levels are calculated; in step S710, whether the human face is a fake face is determined according to the confidence level of the real face and the confidence level of the fake face; in step S711, when the human face is determined to be a fake face, the risk value is calculated according to the confidence level of the fake face; in step S712, when the human face is determined to be a real face, target information is determined; in step S713, a feature vector corresponding to the fake face is matched with a feature vector corresponding to a human face of a celebrity; and in step S714, the target information is determined according to the risk values in step S705, step S708, and step S711, and the matching result in step S713. The specific execution process of the steps is the same as the specific execution process of the corresponding operations in the embodiments of this application, and details are not described herein again.

In some embodiments, in addition to performing real or fake identification on a human face in an image and a video, real or fake identification may also be performed on a human body in an image and a video. A method for performing real or fake identification a human body is similar to a method for performing real or fake identification a human face, except that a type of processed data is different. For example, human face coordinate frame information needs to be changed to human body coordinate frame information, and during obtaining of local feature information and global feature information, local feature information corresponding to a human body and global feature information corresponding to an image including the human body and a background need to be obtained. The specific processing process is similar to the process of the method for real or fake recognition on a human face, and details are not described herein again.

According to the image recognition method in the embodiments of this application, the target object in the image to be recognized and the video to be recognized can be detected and recognized to determine whether the target object is real or fake, and output corresponding target information according to the determining result, to serve the user to perform a corresponding operation according to the target information. According to the image recognition method in the embodiments of this application, on the one hand, in the image recognition process, a machine learning model is used to detect the target object in the image, and a local feature and a global feature are extracted, which improves the efficiency and accuracy of image recognition; on the other hand, when whether the target object is real or fake is recognized, a low-level feature including pixel and texture levels and a high-level feature including global semantic information are adopted, which includes detection at three different phases, to further improve the accuracy of image recognition; and on the other hand, whether the target object that is a fake image uses a portrait of a celebrity can be determined, which protects the portrait right of the celebrity and avoids spread of fake information.

The following describes apparatus embodiments of this application, and the apparatus may be configured to perform the image recognition method in the foregoing embodiments of this application. For details not disclosed in the apparatus embodiments of this application, refer to the embodiments of the foregoing image recognition method of this application.

Figure 8:
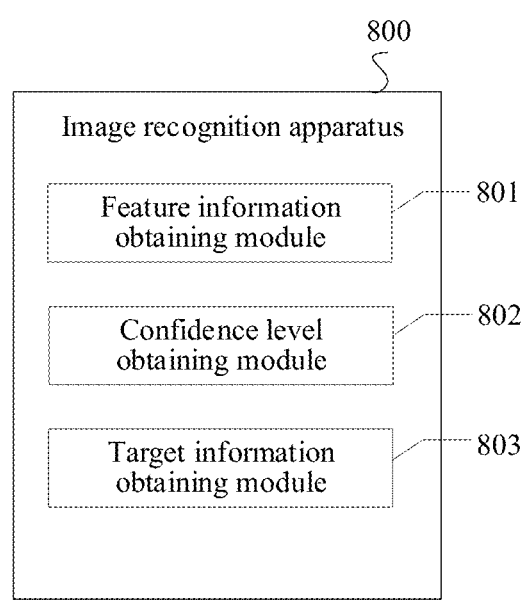
FIG. 8 is a block diagram of an image recognition apparatus according to an embodiment of this application.

FIG. 8 is a block diagram of an image recognition apparatus according to an embodiment of this application.

Referring to FIG. 8, an image recognition apparatus 800 according to an embodiment of this application includes a feature information obtaining module 801, a confidence level obtaining module 802, and a target information obtaining module 803.

The feature information obtaining module 801 is configured to obtain feature information corresponding to a target object in an image to be recognized, the feature information including any one or more of blur degree information, local feature information, and global feature information; the confidence level obtaining module 802 is configured to: determine a category of the target object based on the feature information, and determine a confidence level corresponding to the target object; and the target information obtaining module 803 is configured to obtain target information corresponding to the image to be recognized according to the category of the target object and the confidence level.

In an embodiment of this application, the confidence level obtaining module 802 includes: a first category determining unit, configured to obtain blur degree information corresponding to the target object, and determine the category of the target object according to the blur degree information and a classification threshold; a second category determining unit, configured to obtain local feature information corresponding to the target object when the category of the target object is determined to be real according to the blur degree information and the classification threshold, and determine the category of the target object according to the local feature information; and a third category determining unit, configured to obtain global feature information corresponding to the target object when the category of the target object is determined to be real according to the local feature information, and determine the category of the target object and the confidence level corresponding to the target object based on the global feature information, to obtain the target information corresponding to the image to be recognized according to the category of the target object and the confidence level.

In some embodiments, the first category determining unit includes: a first object graph obtaining unit, configured to detect the target object in the image to be recognized, to obtain a first object graph corresponding to the target object; a second object graph obtaining unit, configured to adjust coordinates of the first object graph, to obtain a second object graph; and a blur degree calculation unit, configured to perform blur degree calculation on the first object graph and the second object graph respectively, to obtain the blur degree information corresponding to the target object.

In some embodiments, the blur degree information includes a first blur degree corresponding to the first object graph and a second blur degree corresponding to the second object graph; the first category determining unit is configured to: divide the second blur degree by the first blur degree, to obtain a blur degree ratio; determine the category of the target object to be real when the blur degree ratio is less than or equal to the classification threshold; and determine the category of the target object to be fake when the blur degree ratio is greater than the classification threshold.

In some embodiments, based on the foregoing solutions, the confidence level obtaining module 802 is configured to: determine a first confidence level corresponding to the target object according to the blur degree ratio and the classification threshold when the category of the target object is determined to be fake according to the blur degree information and the classification threshold.

In some embodiments, the second category determining unit includes: a first feature extraction unit, configured to input the first object graph to a first image recognition model, and perform feature extraction on the first object graph using the first image recognition model, to obtain the local feature information; and a classification unit, configured to perform classification processing on the target object according to the local feature information, to obtain the category of the target object.

In some embodiments, based on the foregoing solutions, the classification unit is configured to: obtain a second confidence level and a third confidence level corresponding to the target object according to the local feature information; determine the category of the target object to be fake when the second confidence level is greater than the third confidence level; and determine the category of the target object to be real when the second confidence level is less than or equal to the third confidence level.

In some embodiments, the confidence level obtaining module 802 includes: a second feature extraction unit, configured to input the image to be recognized to a second image recognition model, and perform feature extraction on the image to be recognized using the second image recognition model, to obtain the global feature information; and a regression unit, configured to perform regression calculation on a region corresponding to the target object according to the global feature information, to obtain the category of the target object and the confidence level corresponding to the target object.

In some embodiments, the regression unit is configured to: perform regression calculation on the region corresponding to the target object based on the global feature information, to obtain a fourth confidence level and a fifth confidence level corresponding to the target object; determine the category of the target object to be fake when the fourth confidence level is greater than the fifth confidence level; and determine the category of the target object to be real when the fourth confidence level is less than or equal to the fifth confidence level.

In some embodiments, the target information obtaining module 803 is configured to: determine the risk value corresponding to the image to be recognized according to the first confidence level determined based on the blur degree information, when the category of the target object is determined to be fake according to the blur degree information and the classification threshold, and obtain the target information based on the category of the target object and the risk value; or determine the risk value corresponding to the image to be recognized according to the second confidence level determined based on the local feature information, when the category of the target object is determined to be fake according to the local feature information, and obtain the target information based on the category of the target object and the risk value; or determine the risk value corresponding to the image to be recognized according to the fourth confidence level determined based on the global feature information, when the category of the target object is determined to be fake according to the global feature information, and obtain the target information based on the category of the target object and the risk value.

In some embodiments, the target information obtaining module 803 is further configured to: match the target object with an object to be matched in a material database to obtain a matching result, when the category of the target object is determined to be fake according to the blur degree information and the classification threshold, and obtain the target information according to the category of the target object, the target confidence level, and the matching result; or match the target object with an object to be matched in a material database, to obtain a matching result when the category of the target object is determined to be fake according to the local feature information, and obtain the target information according to the category of the target object, the target confidence level, and the matching result; or match the target object with an object to be matched in a material database, to obtain a matching result, when the category of the target object is determined to be fake according to the global feature information, and obtain the target information according to the category of the target object, the target confidence level, and the matching result.

In some embodiments, the matching the target object with an object to be matched in a material database is specifically calculating a distance between a feature vector corresponding to the target object and a feature vector corresponding to the object to be matched; and determining that there is a matching relationship between the target object and the object to be matched when the distance is less than a preset distance threshold.

In some embodiments, the obtaining the target information according to the category of the target object, the target confidence level, and the matching result is specifically determining a sixth confidence level according to the distance when there is the matching relationship between the target object and the object to be matched; obtaining the confidence level corresponding to the target object as the target confidence level when the category of the target object is determined to be fake according to the blur degree information, the local feature information, or the global feature information; and determining a risk value corresponding to the image to be recognized according to the sixth confidence level and the target confidence level, and obtaining the target information based on the category of the target object, the matching result, and the risk value.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 9:
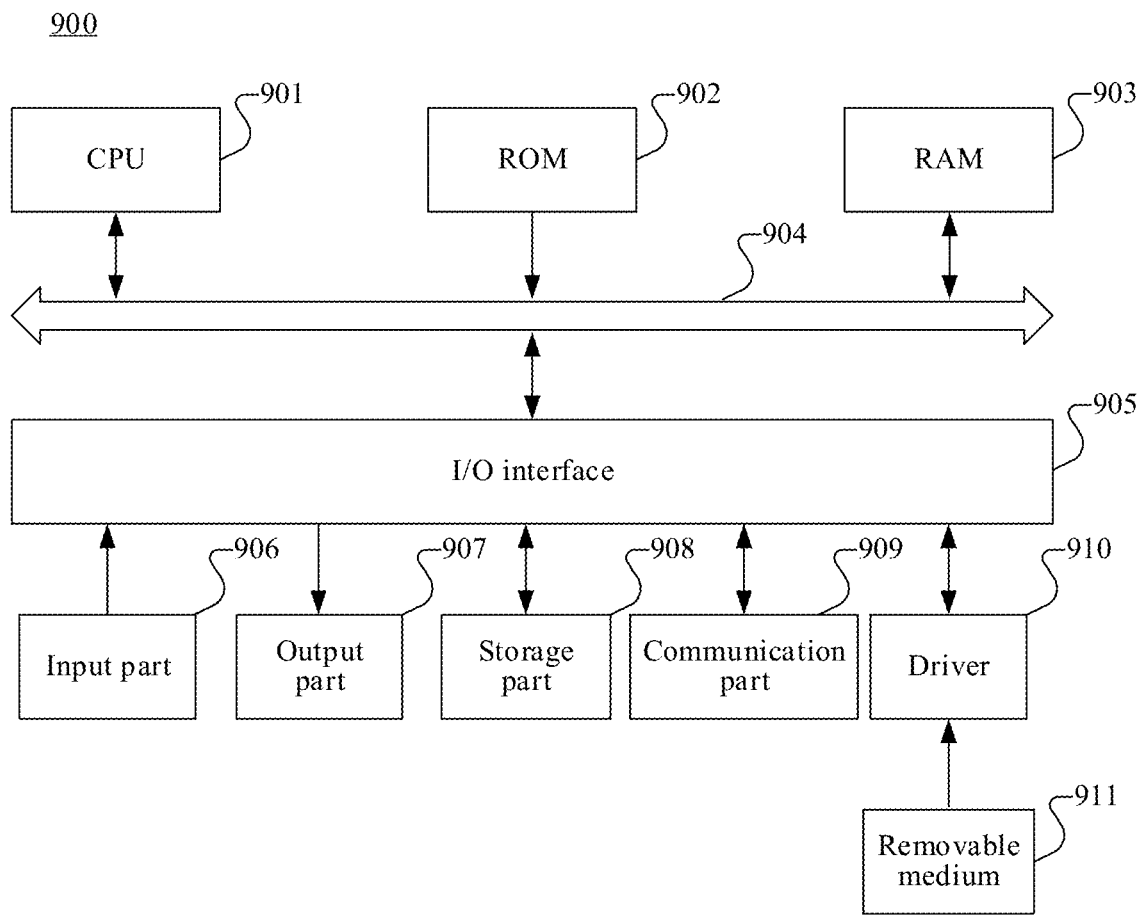
FIG. 9 is a schematic structural diagram of a computer system of an electronic device according to an embodiment of this application.

FIG. 9 is a schematic structural diagram of a computer system of an electronic device according to an embodiment of this application.

A computer system 900 of the electronic device shown in FIG. 9 is merely an example, and does not constitute any limitation on functions and use ranges of the embodiments of this application.

As shown in FIG. 9, the computer system 900 includes a central processing unit (CPU) 901. The CPU may perform various proper actions or processing according to a program stored in a read-only memory (ROM) 902 or a program loaded to a random access memory (RAM) 903 from a storage part 908, to implement image recognition method in the foregoing embodiments. The RAM 903 further stores various programs and data required for operating the system. The CPU 901, the ROM 902, and the RAM 903 are connected to each other through a bus 904. An input/output (I/O) interface 905 is also connected to the bus 904.

The following components are connected to the I/O interface 905: an input part 906 including a keyboard, a mouse, or the like, an output part 907 including a cathode ray tube (CRT), a liquid crystal display (LCD), a speaker, or the like, a storage part 908 including a hard disk, or the like, and a communication part 909 including a network interface card such as a local area network (LAN) card or a modem. The communication part 909 performs communication processing by using a network such as the Internet. A driver 910 is also connected to the I/O interface 905 as required. A removable medium 911, such as a magnetic disk, an optical disc, a magneto-optical disk, or a semiconductor memory, is installed on the drive 910 as required, so that a computer program read from the removable medium is installed into the storage part 908 as required.

In some embodiments, the processes described in the following by referring to the flowcharts may be implemented as computer software programs. For example, this embodiment of this application includes a computer program product, the computer program product includes a computer program carried on a computer-readable medium, and the computer program includes program code used for performing the methods shown in the flowcharts. In such an embodiment, the computer program may be downloaded and installed from the network using the communication part 909, and/or, installed from the removable medium 911. When the computer program is executed by the CPU 901, the various functions defined in the system of this application are executed.

The computer-readable medium shown in the embodiments of this application may be a computer-readable signal medium or a computer-readable storage medium or any combination of the two. The computer-readable medium may be, but not limited to, electricity, magnetism, light, electromagnetism, an infrared ray, or a semiconductor system, apparatus or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The program code included in the computer-readable medium may be transmitted by using any suitable medium, including but not limited to a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It should also be noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this application may be implemented in software, or may be implemented in a hardware, and the unit described can also be set in a processor. Names of the units do not constitute a limitation on the units in a specific case.

According to another aspect, this application further provides a computer-readable medium. The computer-readable medium may be included in the image recognition apparatus described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. In embodiments consistent with this disclosure, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations and the modules and units described herein may be implemented by using software, or may be implemented by combining software and necessary hardware. Therefore, the technical solutions of the embodiments and the modules and units thereof of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments, and the modules and units thereof, of this application.

After considering the specification and practicing the present disclosure, a person skilled in the art may easily conceive of other implementations of this application. This application is intended to cover any variations, uses, or adaptive changes of this application. These variations, uses, or adaptive changes follow the general principles of this application and include general knowledge or technical means in the art, which are not disclosed in this application.

It is to be understood that this application is not limited to the precise structures described above and shown in the accompanying drawings, and various modifications and changes can be made without departing from the scope of this application. The scope of this application is subject only to the appended claims.

What is claimed is:

1. An image recognition method, performed by an electronic device, the method comprising:
    obtaining feature information corresponding to a target object in an image to be recognized, the feature information comprising one or more of blur degree information, local feature information, and global feature information;
    determining a category of the target object based on the blur degree information, and determining a confidence level corresponding to the target object based on the feature information; and
    obtaining target information corresponding to the image to be recognized according to the category of the target object and the confidence level,
    wherein the blur degree information is determined by:
        detecting the target object in the image to be recognized, to obtain a first object image region corresponding to the target object;
        adjusting coordinates of the first object image region, to obtain a second object image region, the second object image region being a region enlarged from the first object image region;
        performing blur degree calculation on the first object image region and the second object image region respectively, to obtain the blur degree information corresponding to the target object.

2. The image recognition method according to claim 1, wherein the determining a category of the target object, and determining a confidence level corresponding to the target object comprises:
    determining the category of the target object according to the blur degree information and a classification threshold;
    obtaining local feature information corresponding to the target object when the category of the target object is determined to be real according to the blur degree information and the classification threshold, and determining the category of the target object based on the local feature information; and
    obtaining global feature information corresponding to the target object when the category of the target object is determined to be real according to the local feature information, and determining the category of the target object and the confidence level corresponding to the target object based on the global feature information.

3. The image recognition method according to claim 1, wherein the obtaining blur degree information corresponding to the target object comprises:
    performing blur degree calculation on the first object image region to obtain a first blur degree and performing blur degree calculation on the second object image region to obtain a second blur degree, the first blur degree and the second blur degree being included in the blur degree information corresponding to the target object; and
    determining the category of the target object to be real or fake based on a comparison between the first blur degree and the second blur degree.

4. The image recognition method according to claim 1, wherein the blur degree information comprises a first blur degree corresponding to the first object image region and a second blur degree corresponding to the second object image region; and
    the determining the category of the target object comprises:
        dividing the second blur degree by the first blur degree, to obtain a blur degree ratio;
        determining the category of the target object to be real when the blur degree ratio is less than or equal to a classification threshold; and
        determining the category of the target object to be fake when the blur degree ratio is greater than the classification threshold.

5. The image recognition method according to claim 4, wherein the determining a confidence level corresponding to the target object based on the feature information comprises:
  determining a first confidence level corresponding to the target object according to the blur degree ratio and the classification threshold when the category of the target object is determined to be fake according to the blur degree information and the classification threshold.

6. The image recognition method according to claim 2, wherein the obtaining local feature information corresponding to the target object, and determining the category of the target object based on the local feature information comprises:
  inputting the first object image region to a first image recognition model, and performing feature extraction on the first object image region using the first image recognition model, to obtain the local feature information; and
  performing classification processing on the target object according to the local feature information, to obtain the category of the target object.

7. The image recognition method according to claim 6, wherein the performing classification processing on the target object according to the local feature information, to obtain the category of the target object comprises:
  obtaining a second confidence level and a third confidence level corresponding to the target object based on the local feature information;
  determining the category of the target object to be fake when the second confidence level is greater than the third confidence level; and
  determining the category of the target object to be real when the second confidence level is less than or equal to the third confidence level.

8. The image recognition method according to claim 2, wherein the obtaining global feature information corresponding to the target object, and determining the category of the target object and the confidence level corresponding to the target object based on the global feature information comprises:
  inputting the image to be recognized into a second image recognition model, and performing feature extraction on the image to be recognized using the second image recognition model, to obtain the global feature information; and
  performing regression calculation on a region corresponding to the target object according to the global feature information, to obtain the category of the target object and the confidence level corresponding to the target object.

9. The image recognition method according to claim 8, wherein the performing regression calculation on a region corresponding to the target object according to the global feature information, to obtain the category of the target object and the confidence level corresponding to the target object comprises:
  performing regression calculation on the region corresponding to the target object according to the global feature information, to obtain a fourth confidence level and a fifth confidence level corresponding to the target object;
  determining the category of the target object to be fake when the fourth confidence level is greater than the fifth confidence level; and
  determining the category of the target object to be real when the fourth confidence level is less than or equal to the fifth confidence level.

10. The image recognition method according to claim 2, wherein the obtaining target information corresponding to the image to be recognized according to the category of the target object and the confidence level comprises:
  determining a risk value corresponding to the image to be recognized according to a first confidence level determined based on the blur degree information, when the category of the target object is determined to be fake according to the blur degree information and the classification threshold, and obtaining the target information based on the category of the target object and the risk value; or
  determining a risk value corresponding to the image to be recognized according to a second confidence level determined based on the local feature information, when the category of the target object is determined to be fake according to the local feature information, and obtaining the target information based on the category of the target object and the risk value; or
  determining a risk value corresponding to the image to be recognized according to a fourth confidence level determined based on the global feature information, when the category of the target object is determined to be fake according to the global feature information, and obtaining the target information based on the category of the target object and the risk value.

11. The image recognition method according to claim 2, wherein the obtaining target information corresponding to the image to be recognized according to the category of the target object and the confidence level comprises:
  matching the target object with an object to be matched in a material database to obtain a matching result, when the category of the target object is determined to be fake according to the blur degree information and the classification threshold, and obtaining the target information according to the category of the target object, a target confidence level, and the matching result; or
  matching the target object with an object to be matched in a material database to obtain a matching result, when the category of the target object is determined to be fake according to the local feature information, and obtaining the target information according to the category of the target object, a target confidence level, and the matching result; or
  matching the target object with an object to be matched in a material database to obtain a matching result, when the category of the target object is determined to be fake according to the global feature information, and obtaining the target information according to the category of the target object, a target confidence level, and the matching result.

12. The image recognition method according to claim 11, wherein the matching the target object with an object to be matched in a material database to obtain a matching result comprises:
  calculating a distance between a feature vector corresponding to the target object and a feature vector corresponding to the object to be matched; and
  determining that there is a matching relationship between the target object and the object to be matched when the distance is less than a preset distance threshold.

13. The image recognition method according to claim 12, wherein the obtaining the target information according to the category of the target object, a target confidence level, and the matching result comprises:

determining a sixth confidence level according to the distance when there is the matching relationship between the target object and the object to be matched;
obtaining the confidence level corresponding to the target object as the target confidence level when the category of the target object is determined to be fake according to the blur degree information, the local feature information, or the global feature information; and
determining a risk value corresponding to the image to be recognized based on the sixth confidence level and the target confidence level, and obtaining the target information based on the category of the target object, the matching result, and the risk value.

14. An image recognition apparatus, comprising at least one memory storing one or more programs and at least one processor, wherein when executing the one or more program, the at least one processor is configured to:
obtain feature information corresponding to a target object in an image to be recognized, the feature information comprising any one or more of blur degree information, local feature information, and global feature information;
determine a category of the target object based on the blur degree information, and determine a confidence level corresponding to the target object based on the feature information; and
obtain target information corresponding to the image to be recognized according to the category of the target object and the confidence level,
wherein the blur degree information is determined by:
detecting the target object in the image to be recognized, to obtain a first object image region corresponding to the target object;
adjusting coordinates of the first object image region, to obtain a second object image region, the second object image region being a region enlarged from the first object image region;
performing blur degree calculation on the first object image region and the second object image region respectively, to obtain the blur degree information corresponding to the target object.

15. A non-transitory computer-readable storage medium, storing a computer program, the computer program being configured to, when run, cause at least one processor to perform:
obtaining feature information corresponding to a target object in an image to be recognized, the feature information comprising one or more of blur degree information, local feature information, and global feature information;
determining a category of the target object based on the blur degree information, and determining a confidence level corresponding to the target object based on the feature information; and
obtaining target information corresponding to the image to be recognized according to the category of the target object and the confidence level,
wherein the blur degree information is determined by:
detecting the target object in the image to be recognized, to obtain a first object image region corresponding to the target object;
adjusting coordinates of the first object image region, to obtain a second object image region, the second object image region being a region enlarged from the first object image region;
performing blur degree calculation on the first object image region and the second object image region respectively, to obtain the blur degree information corresponding to the target object.

16. The computer-readable storage medium according to claim 15, wherein the determining a category of the target object, and determining a confidence level corresponding to the target object comprises:
determining the category of the target object according to the blur degree information and a classification threshold;
obtaining local feature information corresponding to the target object when the category of the target object is determined to be real according to the blur degree information and the classification threshold, and determining the category of the target object based on the local feature information; and
obtaining global feature information corresponding to the target object when the category of the target object is determined to be real according to the local feature information, and determining the category of the target object and the confidence level corresponding to the target object based on the global feature information.

17. The computer-readable storage medium according to claim 15, wherein the obtaining blur degree information corresponding to the target object comprises:
performing blur degree calculation on the first object image region to obtain a first blur degree and performing blur degree calculation on the second object image region respectively, to obtain a second blur degree, the first blur degree and the second blur degree being included in the blur degree information corresponding to the target object; and
determining the category of the target object to be real or fake based on a comparison between the first blur degree and the second blur degree.

18. The computer-readable storage medium according to claim 15, wherein the blur degree information comprises a first blur degree corresponding to the first object image region and a second blur degree corresponding to the second object image region; and
the determining the category of the target object comprises:
dividing the second blur degree by the first blur degree, to obtain a blur degree ratio;
determining the category of the target object to be real when the blur degree ratio is less than or equal to a classification threshold; and
determining the category of the target object to be fake when the blur degree ratio is greater than the classification threshold.

19. The computer-readable storage medium according to claim 18, wherein the determining a confidence level corresponding to the target object based on the feature information comprises:
determining a first confidence level corresponding to the target object according to the blur degree ratio and the classification threshold when the category of the target object is determined to be fake according to the blur degree information and the classification threshold.

20. The computer-readable storage medium according to claim 16, wherein the obtaining local feature information corresponding to the target object, and determining the category of the target object based on the local feature information comprises:
inputting the first object image region to a first image recognition model, and performing feature extraction on the first object image region using the first image recognition model, to obtain the local feature information; and performing classification processing on the target object according to the local feature information, to obtain the category of the target object.

\* \* \* \* \*